United States Patent Office 2,738,322
Patented Mar. 13, 1956

2,738,322

PROCESS FOR REMOVING SULFURIC ACID FROM AQUEOUS SOLUTIONS OF INORGANIC SULFATES

William C. Bauman and Donald F. Harrington, Midland, Mich., assignors to The Dow Chemical Company, Midland, Mich., a corporation of Delaware No Drawing. Application May 12, 1953,
Serial No. 354,631

6 Claims. (Cl. 210—24)

This invention concerns an improved method for removing sulfuric acid from aqueous solutions of inorganic sulfates with anion exchange resins. It relates more particularly to a process wherein sulfuric acid is absorbed on an anion exchange resin and said resin is regenerated to a form suitable for re-employment in the process by washing with water.

The removal of strong acids such as sulfuric acid from an aqueous solution by absorption on an anion exchange resin is well known. The most common procedure is to contact the acidic aqueous solution with a bed of an anion exchange resin in its basic or hydroxide form, whereby the acid is absorbed on the resin and is removed from the solution. After absorption of the acid, the resin is regenerated to its basic or hydroxide form by washing with a dilute aqueous solution of an alkali, e. g. an aqueous 4 per cent by weight solution of sodium hydroxide.

It has now been found that sulfuric acid can readily be removed from an aqueous solution of an inorganic sulfate by contacting such acidic solution with the sulfate form of an anion exchange resin. The sulfuric acid is absorbed by the sulfate form of an anion exchange resin with conversion of the latter at least in part to the bisulfate form and is removed from the solution. The aqueous solution of the inorganic sulfate is drained or washed from the resin, after which the anion exchange resin is regenerated to the sulfate form by washing with water.

Any anion exchange resin containing primary-, secondary-, or tertiary amino groups, or quaternary ammonium groups may be employed in the process. Suitable anion exchange resins are the resinous condensation products of phenol, formaldehyde and alkylene polyamines which are described in U. S. Patent No. 2,341,907; the nitrogen-containing resinous compositions comprising the reaction product of a primary or secondary amine and a halomethylated cross-linked copolymer of a monovinyl aromatic hydrocarbon and a divinyl aromatic hydrocarbon which are described in U. S. Patent No. 2,591,574; and the strongly basic quaternary ammonium anion exchange resins comprising the reaction product of a tertiary amine and a halomethylated insoluble cross-linked vinyl aromatic resin such as the resinous compositions which are described in U. S. Patents Nos. 2,591,573 and 2,614,099. The strongly basic quaternary ammonium anion exchange resins are preferred. The anion exchange resins are employed in the sulfate form.

The sulfate form of such anion exchange resins readily absorb sulfuric acid from aqueous solutions of inorganic sulfates such as an aqueous solution of zinc sulfate, ferric sulfate, aluminum sulfate, magnesium sulfate, or sodium sulfate, containing sulfuric acid.

The method may be employed to remove and separate sulfuric acid from an aqueous solution of any inorganic sulfate. Examples of inorganic sulfates that can be separated from sulfuric acid in an aqueous solution by the invention are sodium sulfate, potassium sulfate, lithium sulfate, magnesium sulfate, stannous sulfate, stannic sulfate, chromic sulfate, cupric sulfate, ferrous sulfate and ferric sulfate.

The method is usually carried out at room temperature or thereabout and at atmospheric pressure. The process may be carried out at temperatures up to about 90° C., but should not be carried out at temperatures that are injurious to the anion exchange resin.

In practice, an aqueous solution of an inorganic salt such as an aqueous solution of zinc sulfate, magnesium sulfate, or sodium sulfate, containing sulfuric acid is contacted with a bed of an anion exchange resin in the sulfate form, preferably a water-immersed bed of the anion exchange resin, with displacement from the bed of an equal volume of water. Thereafter, water is introduced to displace or wash the solution from the bed of the resin. The effluent liquor is collected as successive fractions, whereby there is obtained a fraction of the effluent liquor containing the inorganic sulfate as the principal solute. After collecting the fraction of the effluent liquor containing the inorganic solute, the resin is washed with water, by continued or subsequent introduction of water, to displace the absorbed sulfuric acid from the anion exchange resin and regenerate the resin to the sulfate form. The bed of the resin may thereafter be re-employed for the absorption of a further amount of sulfuric acid from an aqueous solution of an inorganic sulfate, and the cycle of operations repeated.

The water to be employed in the process should be reasonably pure, i. e. it should be free, or substantially free, from ionizable solute. Distilled water, or deionized water, i. e. water that has been demineralized by usual ion exchange methods, is satisfactory, and is usually employed for eluting the solution from the anion exchange resin and regenerating the resin to the sulfate form.

The following examples illustrate ways in which the principle of the invention has been applied but are not to be construed as limiting the scope of the invention.

EXAMPLE 1

A 100 milliliter glass burette was filled with a granular strongly basic quaternary ammonium anion exchange resin to form a bed of the resin approximately 61 centimeters deep. The anion exchange resin was the reaction product of trimethylamine and a chloromethylated copolymer of approximately 87.5 per cent by weight styrene, 4.5 per cent ar-ethylvinylbenzene and 8 per cent divinylbenzene. The resin was in the form of rounded granules of sizes such as to pass through a 50 mesh per inch standard U. S. screen and be retained on a 100 mesh screen. 10 cc. of the wet resin was employed. The anion exchange resin was converted to its sulfate form by treating the same with an aqueous one per cent solution of sulfuric acid, after which the bed of resin was washed with water until the effluent was neutral to litmus paper. The resin had an anion exchange capacity of 1.4 milliequivalents per cubic centimeter of a bed of the resin. The column was filled with water to the top level of the resin bed. Thereafter, 50 cc. of an aqueous solution containing zinc sulfate in amount corresponding to a 0.194 normal zinc sulfate solution and sulfuric acid in amount corresponding to an 0.0814 normal sulfuric acid solution was fed to the column at a rate of one cubic centimeter of the solution per minute with resultant displacement from the bed of the resin of an equal volume of water. After feed of the 50 cc. of the acidic zinc sulfate solution to the column, water was slowly introduced and passed downflow through the bed of the resin. The effluent liquor was collected as successive fractions and the index of refraction determined for each. The index of refraction constitutes an indirect but easily determined measure of the amount of solute in the effluent liquor. Table I identifies each fraction as being stated portions of the effluent liquor and gives the index of refraction of each.

Table I
EFFLUENT LIQUOR

| Fraction No. | Volume, cc. | $n_D^{35°}$ C. |
|---|---|---|
| 1 | 0 – 51.3 | 1.3313 |
| 2 | 51.3– 53.9 | 1.3315 |
| 3 | 53.9– 55.7 | 1.3317 |
| 4 | 55.7– 65.2 | 1.3318 |
| 5 | 65.2– 71 | 1.3319 |
| 6 | 71 – 75 | 1.3320 |
| 7 | 75 – 79 | 1.3322 |
| 8 | 79 – 80.9 | 1.3324 |
| 9 | 80.9– 82.9 | 1.3325 |
| 10 | 82.9– 84.8 | 1.3327 |
| 11 | 84.8– 86.7 | 1.3328 |
| 12 | 86.7– 90.5 | 1.3329 |
| 13 | 90.5– 94.5 | 1.3330 |
| 14 | 94.5– 106 | 1.3331 |
| 15 | 106 – 113.8 | 1.3330 |
| 16 | 113.8– 117.7 | 1.3329 |
| 17 | 117.7– 121.5 | 1.3327 |
| 18 | 121.5– 125.3 | 1.3322 |
| 19 | 125.3– 129.1 | 1.3318 |
| 20 | 129.1– 132.9 | 1.3315 |
| 21 | 132.9– 867 | 1.3313 |
| 22 | 867 – 891 | 1.3314 |
| 23 | 891 – 921.5 | 1.3315 |
| 24 | 921.5– 951.9 | 1.3316 |
| 25 | 951.9– 982.3 | 1.3317 |
| 26 | 982.3–1,043.4 | 1.3318 |
| 27 | 1,043.4–1,074 | 1.3317 |
| 28 | 1,074 –1,811.1 | 1.3316 |
| 29 | 1,811.1–1,285 | 1.3315 |
| 30 | 1,285 –1,415.4 | 1.3314 |
| 31 | 1,415.4–1,488.5 | 1.3313 |

The first of the above fractions was water. Fractions Nos. 2–20 were water containing the zinc sulfate. The fractions were free from acid. Fraction No. 21 was water. The fraction was neutral to litmus paper. Fractions 22–30 were water containing acid in amount corresponding to 97 per cent by weight of the sulfuric acid in the feed solution. Fraction 31 was water. The anion exchange resin was 97 per cent regenerated to the sulfate form.

EXAMPLE 2

A one inch internal diameter glass tube was filled with a granular strongly basic quaternary ammonium anion exchange resin to form a bed of the resin 36 inches deep. The anion exchange resin was composed of the reaction product of trimethylamine and a chloromethylated copolymer of approximately 87.5 per cent styrene, 4.5 per cent ar-ethylvinylbenzene and 8 per cent divinylbenzene. The resin was in the form of rounded granules of sizes from 50 to 100 mesh per inch as determined by standard U. S. screens. The anion exchange resin was converted to its sulfate form by treating the same with an aqueous solution containing one per cent by weight of sulfuric acid, after which the resin was washed with water until the effluent liquor was neutral to litmus paper. The resin had an anion exchange capacity of 1.4 milliequivalents per cubic centimeter of a bed of the resin. The column was filled with water to the top level of the resin bed. Thereafter, 160 cc. of an aqueous solution having a density of 1.190 at 25° C. and containing 15.85 per cent by weight of sodium sulfate and 6.6 per cent of sulfuric acid was fed to the column, with resultant displacement from the bed of an equal volume of water. After feed of the 160 cc. of the acidic sodium sulfate solution to the column, water was slowly introduced. The effluent liquor was collected as successive fractions and the acidity and index of refraction determined for each. Table II identifies the fractions as being stated portions of the effluent liquor and gives the index of refraction at 35° C.

Table II
EFFLUENT LIQUOR

| Fraction No. | Volume, cc. | $n_D^{35°}$ C. |
|---|---|---|
| 1 | 0–228 | 1.3312 |
| 2 | 228–490 | 1.3469 |
| 3 | 490–1,190 | 1.3312 |

The first of the above fractions was water. Fraction No. 2 was water containing all of the sodium sulfate. It was neutral to litmus paper. Fraction No. 3 was water containing no acid.

After collecting the above fractions of effluent liquor, the introduction of water to the column was continued and passed downflow through the bed of the anion exchange resin to displace the absorbed sulfuric acid from the resin and regenerate the resin to the sulfate form. The effluent liquor was collected as successive fractions and each fraction analyzed for sulfuric acid. Table III identifies the fractions as being stated portions of the effluent liquor and gives the amount of sulfuric acid in each, expressed as milliequivalents of sulfuric acid.

Table III
EFFLUENT LIQUOR

| Fraction No. | Volume, cc. | $H_2SO_4$, m. eq. |
|---|---|---|
| 1 | 0–2,000 | 169.7 |
| 2 | 2,000–5,000 | 61.4 |
| 3 | 5,000–7,000 | 25.0 |
| 4 | 7,000–7,400 | 0.8 |

The anion exchange resin was 99.6 per cent regenerated to the sulfate form.

EXAMPLE 3

A charge of 338.5 grams of an aqueous solution containing 10 per cent by weight of magnesium sulfate and 4.3 per cent of sulfuric acid was fed to the bed of the strongly basic quaternary ammonium anion exchange resin in the sulfate form, described in Example 2. Thereafter, water was introduced. The effluent liquor was collected as successive fractions and the fractions tested for acidity and an index of refraction value. Table IV identifies the fractions as being stated portions of the effluent liquor and gives the index of refraction at 35° C., and the amount of sulfuric acid expressed as milliequivalents determined for each fraction.

Table IV
EFFLUENT LIQUOR

| Fraction No. | Volume, cc. | $n_D^{35°}$ C. | $H_2SO_4$, m. eq. |
|---|---|---|---|
| 1 | 0– 218 | 1.3312 | 0 |
| 2 | 218– 733 | 1.3433 | 0 |
| 3 | 733–1,288 | 1.3312 | 0 |
| 4 | 1,288–3,338 | | 176 |
| 5 | 3,338–5,538 | | 64 |
| 6 | 5,538–7,808 | | 22.2 |

The first of the above fractions was water. Fraction No. 2 was water containing the magnesium sulfate. It was neutral to litmus paper. Fraction No. 3 was water. Fractions Nos. 4–6 contained sulfuric acid in amount corresponding to 97 per cent of the sulfuric acid in the feed solution. The anion exchange resin was 97 per cent regenerated to the sulfate form.

We claim:

1. A method for removing sulfuric acid from an aqueous solution of an inorganic sulfate, which method comprises contacting an aqueous solution of an inorganic sulfate containing sulfuric acid with an anion exchange resin in the sulfate form, whereby the sulfuric acid is absorbed on the resin, and separating the treated solution from the anion exchange resin.

2. A method for removing sulfuric acid from an aqueous solution of an inorganic sulfate, which method comprises contacting an aqueous solution of an inorganic sulfate containing sulfuric acid with an anion exchange resin in the sulfate form, whereby the sulfuric acid is absorbed on the resin, separating the treated solution from the resin and washing the anion exchange resin with water.

3. A method for removing sulfuric acid from an aqueous solution of an inorganic sulfate, which method comprises, contacting an aqueous solution of an inorganic sulfate containing sulfuric acid with a strongly basic quaternary ammonium anion exchange resin in the sulfate form, whereby the sulfuric acid is absorbed on the anion exchange resin and separating the treated solution from the anion exchange resin.

4. A method which comprises feeding an aqueous solution of zinc sulfate containing sulfuric acid to a bed of a strongly basic quaternary ammonium anion exchange resin in the sulfate form, whereby the sulfuric acid is absorbed on the anion exchange resin, then feeding water to the bed of the anion exchange resin and collecting a fraction of the effluent liquor containing the zinc sulfate as the sole solute.

5. A method which comprises feeding an aqueous solution of sodium sulfate containing sulfuric acid to a bed of a strongly basic quaternary ammonium anion exchange resin in the sulfate form, whereby the sulfuric acid is absorbed by the anion exchange resin, then feeding water to the bed of the anion exchange resin and collecting a fraction of the effluent liquor containing the sodium sulfate as the sole solute.

6. A method which comprises feeding an aqueous solution of magnesium sulfate containing sulfuric acid to a bed of a strongly basic quaternary ammonium anion exchange resin in the sulfate form, whereby the sulfuric acid is absorbed by the anion exchange resin, then feeding water to the bed of the anion exchange resin and collecting a fraction of the effluent liquor containing the magnesium sulfate as the sole solute.

References Cited in the file of this patent

Ser. No. 359,575, Publication (A. P. C.) May 11, 1943.